Nov. 15, 1955  H. ALLEN  2,724,027
INDICATING DEVICE
Filed Sept. 3, 1953
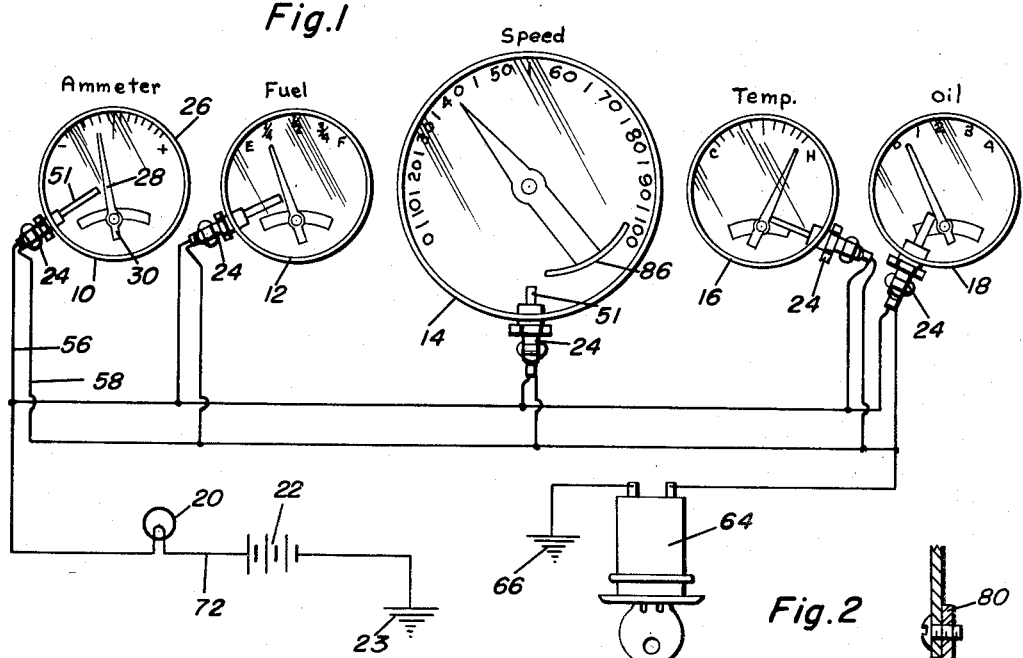
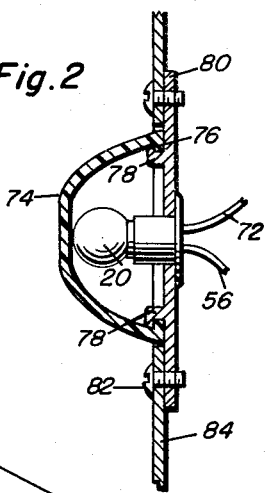
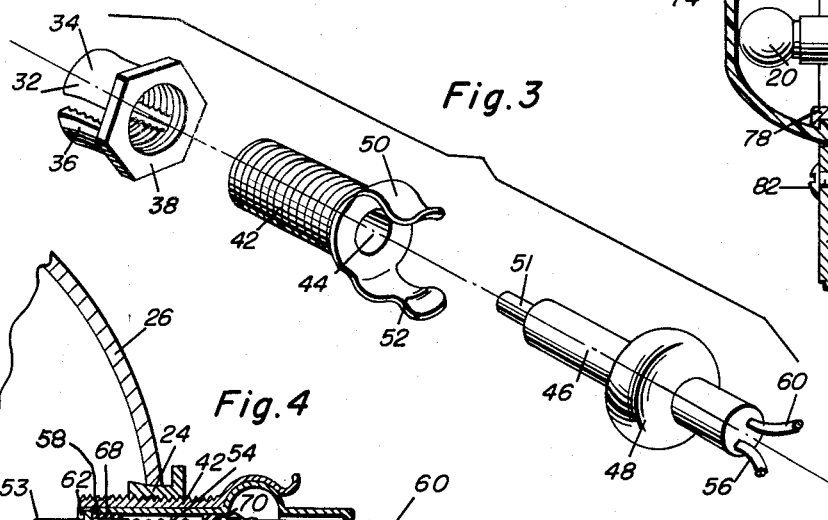
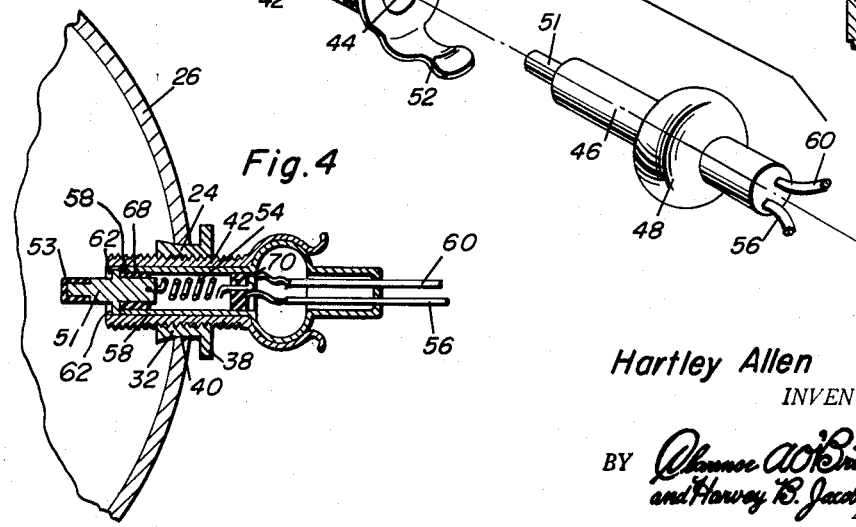
Hartley Allen
INVENTOR.

United States Patent Office 2,724,027
Patented Nov. 15, 1955

2,724,027
INDICATING DEVICE
Hartley Allen, Wampum, Pa.

Application September 3, 1953, Serial No. 378,254

6 Claims. (Cl. 200—56)

This invention relates to an attachment for motor vehicles, aircraft and other like machinery, and more particularly to an alarm switch for use in a dial actuated signalling system for providing a warning to the operator of the machinery that an unsatisfactory condition exists with respect to one or more of the factors involved in the proper operation of the machinery.

The primary object of the present invention resides in the provision of a signalling system for providing a warning to an operator of a machine, such as a motor vehicle or aircraft, that an unsatisfactory condition exists. Incorporated in the present invention is a novel alarm switch which may readily be installed in combination with various existing dials as presently mounted on conventional vehicles.

The construction of this invention features an alarm switch which includes a novel split type ferrule or collet which enables the switch to be readily and conveniently installed in combination with an existing dial casing of any of a plurality of instruments mounted on an instrument board, whereby means are provided for effectively exciting a signal device, such as a lamp or buzzer, so that the operator of the vehicle or other type of machinery can be warned that an unsatisfactory condition exists. This switch further includes a novel sleeve having a resilient clip appended thereto for engaging an enlarged body portion of an insert containing a movable and fixed contact.

Still further objects and features of this invention reside in the provision of a novel alarm switch and signal arrangement incorporating the alarm switch which is simple in construction and easy to install, capable of being produced at a relatively low cost so as to enable wide distribution, which does not affect the proper operation of the instruments, and which is unobtrusive in appearance.

These, together with the various ancillary objects and features of the invention which will become apparent as the following description proceeds, are attained by these alarm switches and signalling system, a preferred embodiment of which has been illustrated in the accompanying drawings, by way of example only, wherein:

Figure 1 is a diagrammatic view illustrating the manner in which the alarm switches may be associated with the various instruments of the type as conventionally mounted on an instrument panel, and further illustrating the manner in which the alarm switches are connected to a signalling device and a suitable source of electrical power;

Figure 2 is a sectional detail view illustrating the construction of a form of signalling device;

Figure 3 is an exploded perspective view of the individual elements forming the alarm switch utilized in this invention; and Figure 4 is a sectional detail view illustrating the manner in which the alarm switches are used in conjunction with the indicator dial casings.

With continuing reference to the accompanying drawings wherein like reference numerals designate similar parts throughout the various views, reference numerals 10, 12, 14, 16 and 18 generally designate the various existing instruments as usually emplaced on the instrument panel or dashboard of an automobile or other vehicle, and which are adapted to indicate, respectively, the flow of electricity, the amount of fuel in the tank of the vehicle, the speed of the vehicle, the temperature of the liquid coolant, and the oil pressure. Obviously, this invention can be associated with other varieties and types of instruments which may be utilized for separate and different purposes.

In accordance with the concepts of the present invention, there is provided a signal device such as a lamp 20 which is mounted in full view of the operator of the vehicle and which is electrically operatively connected to a suitable source of electrical current, such as the battery 22. The battery 22 is grounded, as at 23. Connected in series connection with the signal device 20 and in parallel with each other are a plurality of alarm switches 24 which are associated with the casings of the instruments 10, 12, 14, 16 and 18. Each of the respective instruments has a suitable casing, such as is indicated by reference numeral 26, and further are provided with pointers 28 as incorporated in the ammeter 10. The alarm switches 24 are adapted to be actuated upon selective movement of the pointers 28. Extensions 30 of the pointers 28 may be provided which, in suitable arrangements, can be used to actuate the alarm switches 24.

Each of the alarm switches 24 consists of a split ferrule type of collet 32 having bifurcated internally threaded portions 34 and 36 joined by a headed end portion 38. The collet 32 is received within a suitable aperture, such as at 40, in the casing 26. The outer surfaces of the bifurcated portions 34 and 36 are somewhat arcuate in shape and are expanded by the threaded engagement of the sleeve 42 therein so as to rigidly lockingly hold the collet 32 and hence the entire alarm switch assembly 24 in suitable position. The sleeve 42 is provided with an aperture 44 therethrough which is adapted to receive an insert member 46 extending through the sleeve 42. The insert member 46 has an enlarged body portion 48 resiliently engaged by the clip elements 50 and 52 affixed to and forming part of the sleeve 42. These clip elements, while resiliently holding the enlarged body portion 48 of the insert member 46, provide means for permitting the sleeve 42 to be more easily rotated within the collet 32, thereby enabling the entire assembly to be more easily adjusted. The insert member 46 contains a movable contact 51 which may have an insulated tip 53 and which is operatively electrically connected by a spring 54 to a suitable conductor 56 leading from one of the terminals from the conductor 56. The fixed contact comprising an electrically conductive tubular portion 58 of the insert member 46 is operatively electrically connected to a conductor 60. The spring 54 which is under compression yieldingly urges the contact member 51 together with the movable contact points 62 mounted thereon which are adapted to engage the fixed contact 58 out of engagement with the fixed contact 58. However, when the pointer 28 engages the tip or end 53 of the contact member 51, such will be depressed against the resilient spring 54 to enable the contact points 62 to contact the fixed contact 58. This will complete an operative electrical circuit from the battery 22 which is grounded at 24 through the signalling or alarm device 20 through the conductor 56 and the conductor 60 through, alternatively, the ignition switch 64 and to ground, as at 66. Obviously, the spring 54 may be suitably insulated by means of plugs 68 and 70, as may be necessary.

The signal device 20 may comprise an electric bulb which is connected by a suitable conductor 72 to the battery 22 and to the conductor 56. A transparent dome 74 is provided for the lamp 20 and is held in place by the interlocking engagement of the peripheral flange 76 formed on the dome 74 and the peripheral lug 78 formed on a plate 80 preferably of insulative material which is suitably attached, as by screws 82, to the instrument panel 84. Hence, when the ammeter 26 is discharging to a considerable extent, the pointer 28 will actuate the contact member 51 and will complete an operative electrical circuit whereby the signalling device 20 will be actuated. Dependent upon the construction of the various pointers and instruments, different means can be utilized for actuating the contact member 51. For example, in the speed indicator or speedometer 14, there is provided an arcuate contact plate 86 which is adapted to engage the contact member 51, as can be best seen in Figure 1.

Since from the foregoing, the construction and advantages of these indicating devices are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer.

2. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer, said insert member having an enlarged body portion, said means comprising a resilient clip attached to said sleeve with said insert member extending through said sleeve.

3. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer, said insert member including resilient means yieldingly holding said movable contact out of engagement with said fixed contact.

4. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer, said insert member having an enlarged body portion, said means comprising a resilient clip attached to said sleeve with said insert member extending through said sleeve, said insert member including resilient means yieldingly holding said movable contact out of engagement with said fixed contact.

5. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer, said insert member having an enlarged body portion, said means comprising a resilient clip attached to said sleeve with said insert member extending through said sleeve, said insert member including resilient means yieldingly holding said movable contact out of engagement with said fixed contact, said movable contact having an electrically insulative end for engagement with said pointer, said pointer urging said movable contact into engagement with said fixed contact at a preset position of said pointer.

6. An alarm switch for use in combination with an indicating dial casing and a separately actuated pointer rotatably mounted in said casing comprising a collet secured in said casing, a sleeve threadedly secured in said collet, an insert member, means on said sleeve engaging said insert member holding said insert member in a fixed relationship relative to said sleeve, said insert member having a fixed contact and a movable contact, said movable contact being engageable by said pointer, said fixed contact and said movable contact being operatively electrically connected to a signal device and to a source of electrical power.

References Cited in the file of this patent

UNITED STATES PATENTS 2,358,729    Murphy -------------- Sept. 19, 1944